US006695383B2

(12) United States Patent
Wood (10) Patent No.: US 6,695,383 B2
(45) Date of Patent: Feb. 24, 2004

(54) CONTAINER COVER (76) Inventor: Robert Arthur Wood, 4390 SW. Oakhaven La., Palm City, FL (US) 34990

( * ) Notice: Subject to any disclaimer, the term of this patent is extended or adjusted under 35 U.S.C. 154(b) by 0 days.

(21) Appl. No.: 10/202,993

(22) Filed: Jul. 25, 2002

(65) Prior Publication Data
US 2003/0034666 A1 Feb. 20, 2003

(30) Foreign Application Priority Data
Jul. 27, 2001 (GB) .............................................. 0118361

(51) Int. Cl.$^7$ ................................................. B60J 11/00
(52) U.S. Cl. ............... 296/98; 296/100.01; 296/100.14; 296/101
(58) Field of Search .............................. 296/98, 100.01, 296/101, 100.14

(56) References Cited

U.S. PATENT DOCUMENTS

| 4,082,347 | A | * | 4/1978 | Petretti | 296/98 |
| 4,126,351 | A | * | 11/1978 | Peteretti | 296/98 |
| 4,341,416 | A | | 7/1982 | Richard | 296/98 |
| 5,031,955 | A | * | 7/1991 | Searfoss | 296/98 |
| 5,129,698 | A | * | 7/1992 | Cohrs et al. | 296/98 |
| 5,238,287 | A | | 8/1993 | Haddad, Jr. | 296/98 |
| 5,275,459 | A | * | 1/1994 | Haddad, Jr. | 296/98 |
| 5,388,882 | A | * | 2/1995 | Russell et al. | 296/98 |
| 5,482,347 | A | * | 1/1996 | Clarys et al. | 296/98 |
| 5,752,735 | A | | 5/1998 | Fleming et al. | 296/98 |
| 5,803,528 | A | * | 9/1998 | Haddad, Jr. | 296/98 |
| 5,829,818 | A | * | 11/1998 | O'Daniel | 296/98 |
| 5,957,523 | A | * | 9/1999 | Haddad, Jr. | 296/98 |
| 6,273,490 | B1 | * | 8/2001 | Haddad, Jr. | 296/98 |
| 6,318,790 | B1 | * | 11/2001 | Henning | 296/98 |
| 6,464,283 | B2 | * | 10/2002 | Haddad, Jr. | 296/98 |
| 2002/0140249 | A1 | * | 10/2002 | Henning | 296/98 |

FOREIGN PATENT DOCUMENTS

WO        2349 622 A     11/2000    ......... B60P/7/04

* cited by examiner

Primary Examiner—D. Glenn Dayoan
Assistant Examiner—Lori L Coletta
(74) Attorney, Agent, or Firm—Raymond M. Galasso; Simon, Galasso & Frantz PLC (57) ABSTRACT A cover assembly for a container of a vehicle, wherein the container has a first end and a second end. The cover assembly comprises a retractable cover having a first end attached to a roller assembly and a second end attached to a cover support element, and rolling means adapted to roll the cover upon the roller assembly. The cover support element is supported by at least one pivot arm at an upper end thereof. The pivot arm is pivotable about a lower end thereof at a point intermediate the two ends of the container and adjacent the bottom of the container, between a first position in which the cover support element is adjacent the first end of the container and a second position in which the cover support element is adjacent the second end of the container. The roller assembly is mounted for movement between a lower position.

40 Claims, 13 Drawing Sheets

CONTAINER COVER

BACKGROUND OF THE INVENTION

1. Field of the Invention

The present invention relates to a container cover. In particular, it relates to a cover for a container of a truck having a material carrying container, such as a tipper truck.

2. Description of the Prior Art

It is well known to provide a cover for the material carrying container of a truck. Such covers are particularly useful when transporting loose materials such as sand or gravel, to prevent the load from being blown out of the container by the wind. Additionally, the cover protects the load from contamination. Many examples of container covers are known in the prior art. A popular arrangement for covering a truck container is to use a tarpaulin (or 'tarp') or other flexible cover, mounted upon a roller assembly adjacent one end of the truck container. The tarp is pulled from one end of the truck to the other by means of a front-to-rear pivot arm assembly.

Typically in such arrangements, a roller bar and bearing assembly is permanently mounted to the front of the truck, usually upon the headboard or cab shield of the vehicle. The roller bar assembly includes a set of bearings mounted upon bearing plates or a tarp housing assembly that includes a wind deflector spanning the entire width of the vehicle body. If bearing plates are used instead of a tarp housing, a separate wind deflector may be mounted between the bearing plates to prevent the wind from blowing under the tarp when the pivot arms are in the deployed position. Such arrangements are not without problems.

If the permanently mounted roller assembly is positioned low down on the headboard or cab shield (such as that shown in U.S. Pat. No. 5,275,459), the tarp covers the container body most effectively, with no gap along the sides and thus most effectively protected from the wind. However, the roller bar is then susceptible to damage from material being loaded into the container, or from loading apparatus striking the roller assembly which is mounted at or near the level of the container opening.

To prevent such damage, the permanently mounted roller bar assembly is often mounted higher up on the headboard or cab shield (see for example U.S. Pat. Nos. 5,031,955 and 5,957,523), the tarp and assembly is most effectively out of the way of the loading apparatus and material being loaded and is thus well protected from damage. However, the tarp, when in the deployed position, is spaced from the upper edge of the container at the front and sides of the vehicle and is thus highly susceptible to wind entering under the tarp during transit, inflating the tarp. This has several disadvantageous results. Firstly, the increased air resistance creates greater drag on the vehicle and increases fuel consumption. Secondly, the gap that is created in the side of the tarp above the side rails of the container allows the wind to blow the contents of the container around and, escape through the side gap in the tarp. The life of the tarp itself is often reduced as well because of excessive and continual flapping from the wind. Thus the effectiveness of the cover is dramatically reduced.

Several solutions to these apparent problems have been devised. U.S. Pat. No. 5,031,955, describes the use of a secondary arm attached to the pivot arm and adapted to exert a downward force upon the tarp adjacent the forward edge of the container body. U.S. Pat. No. 5,957,523 describes a similar arrangement in which a secondary arm mounted upon the headboard or cab shield is used to exert a downward force upon the tarp adjacent the front of the container. In both cases, the roller assembly is mounted at the top of the headboard or cab shield. Such an arrangement still presents the leading edge of the tarp to the wind, thus still acting to funnel wind under the tarp, albeit at a reduced level if used in conjunction with a mesh or net tarp. These configurations are not effective with a tarp made of solid, non-mesh material such as a solid vinyl tarp unless great force is exerted in a downward direction on the tarp from the secondary arm mechanism to lock the arm in place. If great force is not used to hold down the tarp, a parachute effect will overcome the vertical portion of the solid tarp and lift the secondary arm up, rendering it useless in performing its function to hold down the tarp in the front of the container opening. Increased fuel consumption remains a problem in that increased air resistance is created by the vertical portion of the tarp between the roller assembly mounted at the top of the headboard or cab shield and the top side edges of the container.

The present invention has been devised in order to address the deficiencies in the prior art.

BRIEF SUMMARY OF THE INVENTION

According to the present invention in one aspect there is provided a cover assembly for a container of a vehicle; the container having first and second ends and the cover assembly comprising a retractable cover having a first end attached to a roller assembly and a second end attached to a cover support element, the cover assembly comprising rolling means adapted to roll the cover upon the roller assembly. The cover support element is supported by at least one pivot arm at an upper end thereof, said pivot arm being pivotable about a lower end thereof at a point intermediate the two ends of the container and adjacent the bottom of the container, between a first position in which the cover support element is adjacent the first end of the container and a second position in which the cover support element is adjacent the second end of the container. The roller assembly is mounted for movement between a lower position in which the roller assembly is substantially adjacent the top of the container at the first end thereof when the pivot arm is in said second position, and an upper position in which the roller assembly is more greatly spaced from the top of the container when the pivot arm is in the first position.

Preferably, said rolling means comprises a motor assembly associated with the roller assembly. Typically, the motor assembly is an electric, pneumatic or hydraulic motor. The motor assembly may be mounted externally from the roller assembly. Alternatively, the roller assembly includes a cavity adapted to house the motor assembly. Alternatively or additionally, the rolling means includes a spring assembly adapted to bias the retractable cover into a rolled configuration.

Preferably, the at least one pivot arm is biased by means of a spring associated with the lower end of the pivot arm into a position in which the cover support element is adjacent the second end of the container. Alternatively, the at least one pivot arm is biased by means of hydraulic or pneumatic cylinder(s) in conjunction with a spring biased roller assembly.

In one embodiment, the roller assembly is mounted for movement between the upper and lower positions by being mounted upon at least one pivotally mounted roller arm. More preferably, the roller arm is pivotally mounted at a point intermediate the upper and lower positions. Typically, the vehicle is a road lorry having a headboard or cab-shield and the roller arm pivot point is provided internally or externally mounted on the side plates of the headboard or cab-shield, or upon a rearwardly directed sidewall attached to the headboard or cab-shield.

In a further embodiment, in which the vehicle or the container is provided with sidewalls adjacent and above each side of the first end of the container, the roller assembly is mounted for movement between upper and lower positions by being mounted to run between and in respective tracks formed in the sidewalls. In one arrangement, the tracks are non-linear and may be arcuate, conforming to the shape and design of the headboard or cab shield. In an alternative arrangement, the tracks are linear.

In a yet further embodiment, each roller arm is pivotally mounted upon a respective pivot arm.

Advantageously, the roller assembly further includes a tie bar substantially parallel with the roller bar and extending below the roller bar to contact the top edges of the container side rails when the tarp is in the fully extended position. Thereby the roller bar and tarp are prevented from contacting the top side edges or any other part of the container while the tarp is rolled onto or off of the roller bar. The tie bar also acts as a stabilizer bar that allows the two roller arms and the roller assembly to move synchronously between the fully retracted and fully extended positions.

It can be considered that a single actuating means works in conjunction with a spring force to move pivot arms between the first and second positions and move the roller assembly between the lower and upper positions.

In another aspect, the present invention provides a covering assembly for covering a open top of a vehicle mounted container having a first end and a second end joined by two side walls, together forming an upper edge that defines the container opening. The cover assembly further comprises a retractable cover having a first end attached to a variable position roller assembly, and a second end attached to a cover support element. The cover support element extends substantially transversely between the two side walls of the container and is supported by at least one pivot arm attached to the end of the cover support element at the upper end of the at least one pivot arm. The at least one pivot arm is pivotable about a lower end thereof at a point (in one embodiment) on or adjacent at least one of the two side walls, intermediate the first and second ends of the container, and is biased about the intermediate point between a first position in which the cover support element is adjacent the first end of the container and a second position in which the cover support element is adjacent the second end of said container. The variable position roller assembly is mounted with means for movement of the roller assembly from a first position in which the roller assembly is substantially adjacent or below the upper edge of the first end of the container when the at least one pivot is in the second position. The roller assembly moves through a variable range of motion as the at least one pivot arm moves to a first position in which the roller assembly substantially meets the cover support element at the first position of the at least one pivot arm, adjacent the first end of the container. The roller assembly is actuated by rolling means.

Suitably, the biasing means to move at least one pivot arm from said first position to said second position is a torsion, compression, or extension spring. Alternatively, the biasing means comprises at least one hydraulic or pneumatic cylinder, or electric motor-driven actuator.

Preferably the first position of the variable position roller assembly is a lower position in which the roller assembly is substantially adjacent the upper edge of the container at the first end thereof when the at least one pivot arm is in the second position, and the second position is an upper position in which the roller assembly is more greatly spaced from the upper edge of the container when the at least one pivot arm is in the first position.

In one embodiment, preferably, the means for movement of the roller assembly includes at least one pivotally mounted roller arm, pivotally mounted at a point intermediate the upper and lower positions. Typically, the rolling means is an electric, pneumatic, or hydraulic motor associated with the roller assembly Advantageously, the rolling means includes a spring assembly adapted to bias the retractable cover into a rolled configuration.

In a second embodiment, the rolling means is a manual crank assembly including chains and sprockets and/or belts and pulleys to bias the roller assembly.

Suitably, the means for movement of the roller assembly includes at least one pivotally mounted roller arm supporting at least one end of the roller assembly.

Alternatively, the means for movement of the roller assembly includes a track system in which both ends of the roller assembly are supported by and slide within parallel tracks mounted on or from the container.

Suitably, the roller assembly is actuated by a rolling means which in turn actuates the movement of the roller assembly throughout its variable range of motion in cooperation with the movement of the at least one pivot arm between the first and second positions.

In an alternative embodiment, the at least one pivot arm is pivotally mounted to a frame of the vehicle.

Equally, in an alternative embodiment, the variable position roller assembly is also mounted to the frame of the vehicle.

It will be appreciated by those skilled in the art that reversing the positions of the cover support element and the variable position roller assembly will obtain the same objectives. Accordingly, these arrangements form a yet further aspect of the present invention.

The above and other aspects of the present invention will now be described in further detail, by way of example only, with reference to the accompanying drawings.

DETAILED DESCRIPTION

Figure 1:
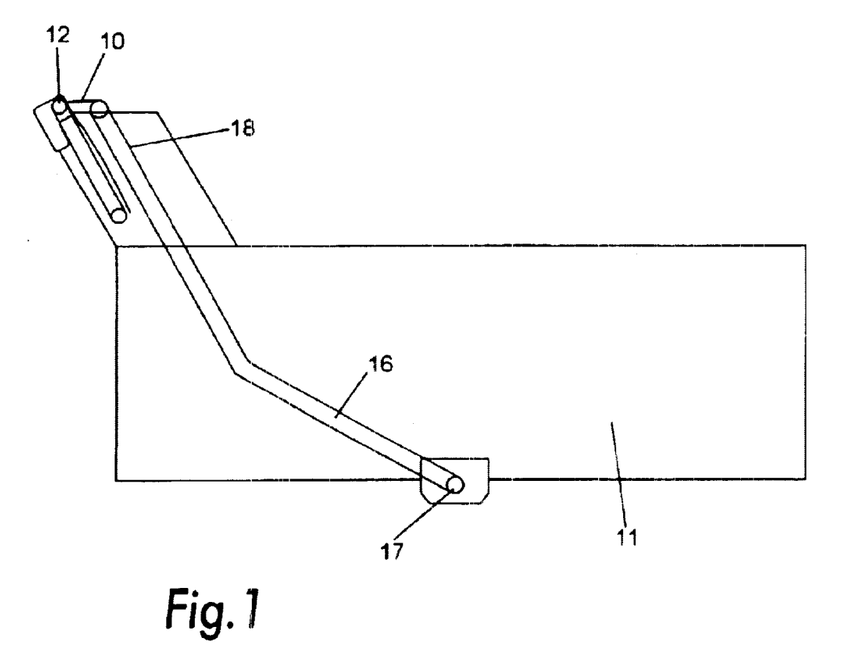
FIG. 1 is a schematic side view of a first embodiment of an apparatus in accordance with the present invention in a retracted configuration.
Figure 6:
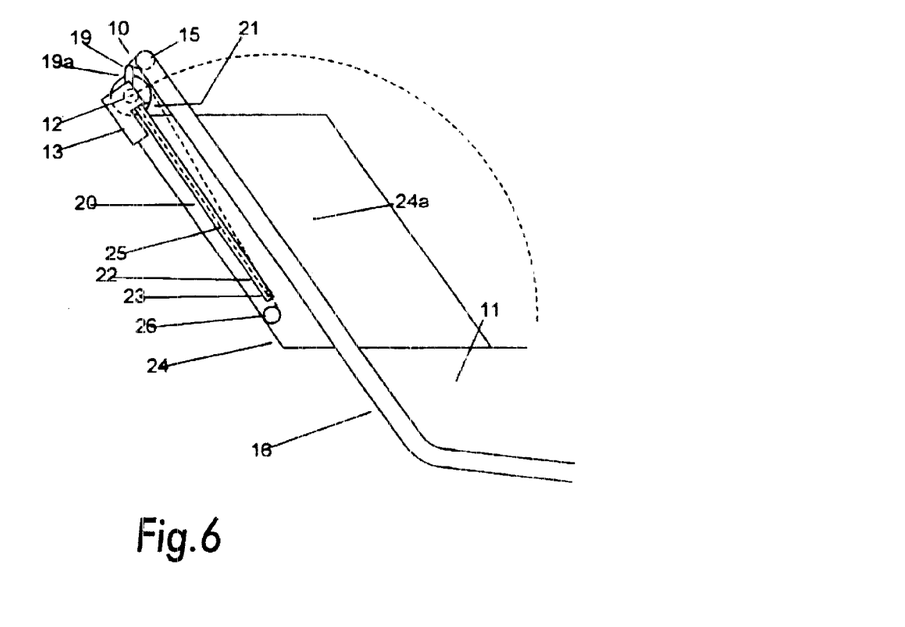
FIG. 6 shows in schematic detail, the principle features of the embodiment of FIG. 1, in the retracted configuration.

With reference initially to FIGS. 1 and 6, there is illustrated a first embodiment of the apparatus of the present invention in a configuration in which a cover or tarp 10 is fully retracted leaving a container 11 open. Container 11 is mounted upon a lorry chassis (not shown) which includes the usual components, wheels, engine, cab etc (omitted for clarity). Typically, the lorry is of the type including a tipping arrangement to raise the front end of the container, thus causing the contents of the container to be ejected from a horizontally pivoting door in the rear of the container. Such vehicles and their operating mechanisms are well known in the art and will not be described in any further detail.

Figure 2:
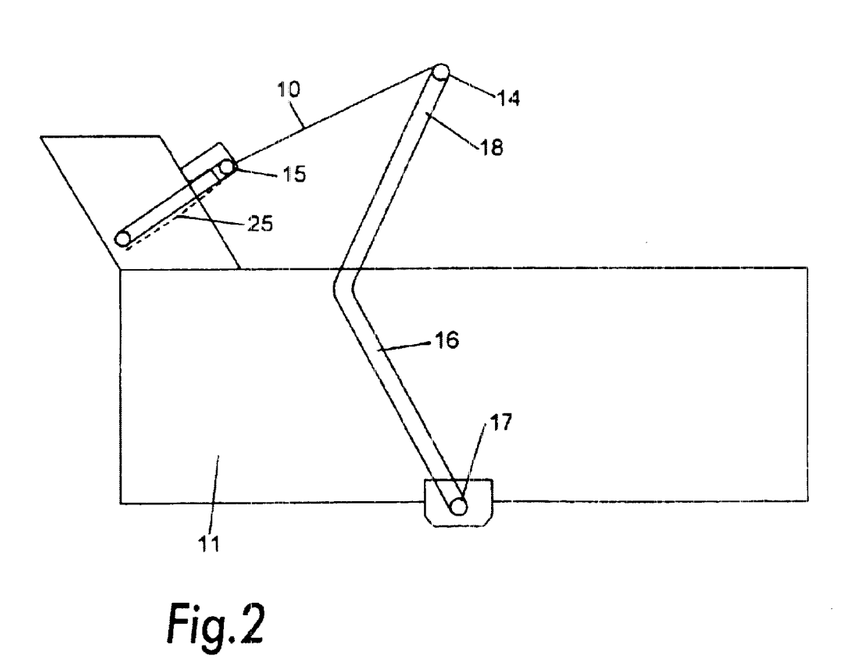
FIG. 2 is a schematic side view of the embodiment of FIG. 1 in a part extended configuration.
Figure 3:
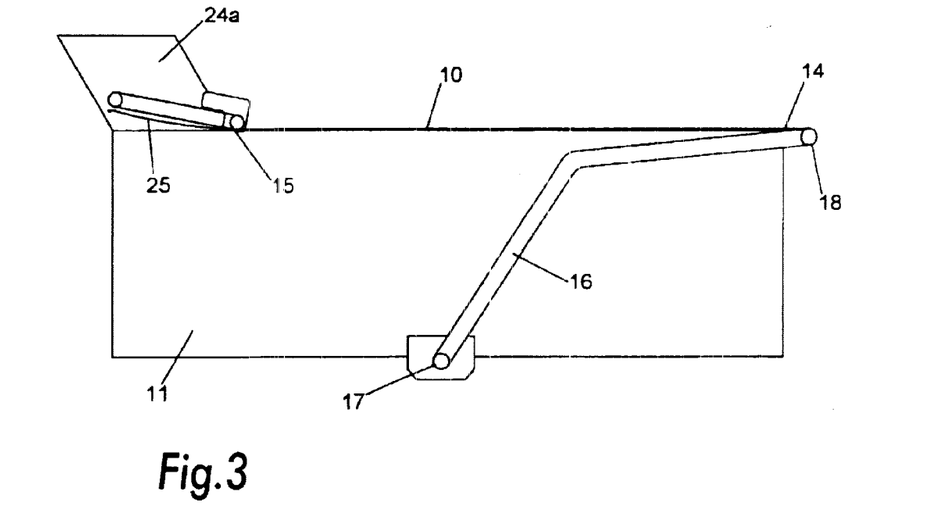
FIG. 3 is a schematic side view of the embodiment of FIG. 1 in a fully extended configuration.
Figure 7:
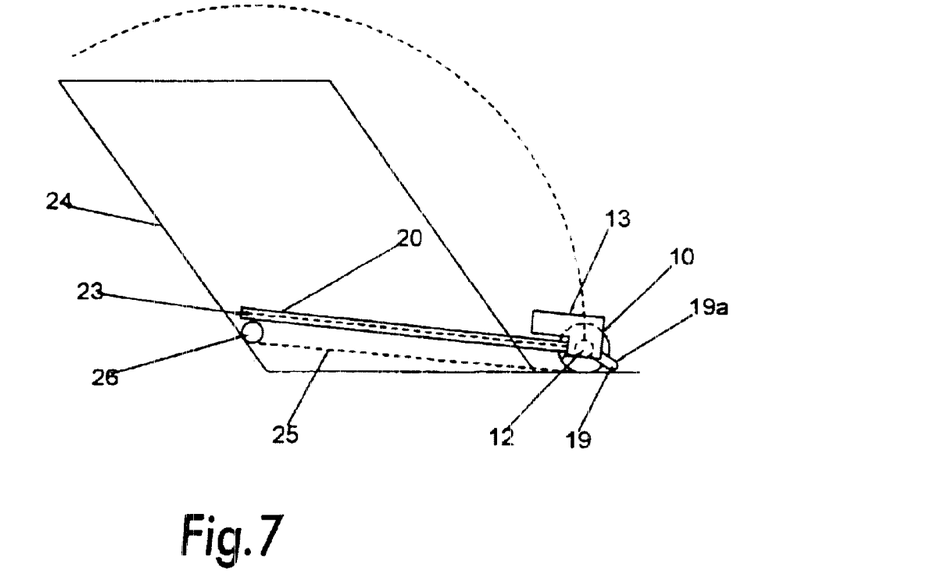
FIG. 7 shows the same arrangement as FIG. 6, in the fully extended configuration.

FIG. 2 shows the apparatus in an intermediate configuration and FIGS. 3 and 7 illustrate the apparatus in a fully extended configuration in which the tarp 10 is fully extended to cover the container 11.

In the retracted configuration, the tarp 10 is rolled up onto a roller assembly including a roller bar 12. The tarp 10 has a first end 14 attached to a cover support element in the form of pivot arm cross bar 15 mounted between respective ends of two pivot arms 16. A second end of tarp 10 is attached to the roller bar 12. The roller assembly also includes an actuator mechanism. Typically, the actuator mechanism comprises a motor assembly 13 comprising a motor, together with such gearing as may be required depending upon the characteristics of the motor used and a clutch and/or brake mechanism if required. A wide range of motors are suitable for this application and will include electric, hydraulic and pneumatic motors. The motor may be mounted externally of the roller bar 12, although for protection of its mechanism and reduction of the outer width requirements, it may be preferred to mount the motor within a cavity within the roller bar 12. A spring assembly within the roller bar provides a suitable alternative actuator assembly to a motor assembly.

The motor may be bi-directional such that the motor acts upon the roller bar 12 both to pay out the tarp and in reverse to roll the tarp back onto the roller bar 12. The motor assembly also acts as a brake to prevent pay out of the tarp except under control of the motor. Alternatively, the motor may act only to roll the tarp 10 onto the roller bar, with alternative means such as those described below, being provided to cause unrolling of the tarp. With such an arrangement, additional means are provided to prevent uncontrolled unrolling of the tarp. Those skilled in the art will be readily able to devise a range of assemblies suitable for achieving the objectives as set out below.

The roller assembly may also include a tie bar 19 mounted upon brackets 19a to project rearwardly (toward the rear of the container) and below the roller bar 12. Tie bar 19 is parallel to roller bar 12 and the tarp 10 passes over (as viewed in FIG. 6) the tie bar 19 and is then attached to the pivot arm cross bar 15.

Pivot arms 16 are pivoted about their lower ends 17 at points on each side of the container at a point substantially intermediate the front and rear ends of the container 11. They are caused to move between a first position in which its upper end 18 is adjacent the front of the container and the headboard or cab-shield 24 (FIG. 1) and a second position (FIG. 3) in which the upper end 18 is adjacent the rear of the container 11, by suitable actuating means. Typically, the actuating means comprises a spring assembly (not shown) in which the spring acts to bias the pivot arm into the fully extended configuration. Alternative actuating means for pivot arms 16 may comprise hydraulic or pneumatic cylinders.

The roller assembly is attached to a first end 21 of a roller arm 20, the second end 22 of which is pivotally mounted at a roller arm pivot point 23 upon the rear-facing wall of the headboard or cab-shield 24 of the lorry or formed within cab-shield side walls 24a. In this embodiment, two roller arms 20 are provided, one at each side of the roller bar. In the fully-retracted configuration (FIGS. 1 and 6), the first end 21 of the roller arm 20 is highermost and in the extended configuration, the second or pivoting end 22 is highermost.

The roller arms 20 also provide a convenient means for routing the electrical wires or pneumatic or hydraulic lines for operation of the motor.

As will be seen most clearly from FIGS. 1 to 3, from the retracted configuration in FIG. 1, the motor assembly is actuated to pay out the tarp 10 assisted by the spring biasing of pivot arms 16 which acts to put the tarp 10 across the container 11. As pivot arm 16 pulls the tarp 10, roller arm 20 is caused to pivot from its upwardly directed orientation in the retracted position (FIG. 1) to a position in which it is, essentially, aligned with the tarp 10 (FIG. 2). This continues until the tarp 10 rests upon the upper rear edge of the container 11 as shown in FIG. 3. The roller assembly follows an arcuate path as shown by the dotted arcuate line in FIGS. 6 and 7.

Tie bar 19 is positioned below and behind (toward the rear of the container 11) the roller bar 12 so as to contact the upper side edges of the container and prevent the roller bar from direct contact with the container 11. This avoids damage to the roller bar and ensures that no part of the container 11 interferes with the free rolling of the roller bar 12.

It will be appreciated that in the extended configuration, there will remain an area between the headboard or cab-shield 24 and the roller assembly which is not covered by the tarp 10. Accordingly, a secondary tarp or pivot sheet 25 is provided. Pivot sheet 25 is mounted at one end thereof to the headboard or cab-shield 24 at an anchor point 26 below but adjacent the pivot point 23. As shown, typically, pivot sheet anchor point 26 is formed by a bar clamping the pivot sheet 25 against the headboard or cab-shield 24. Pivot sheet 25 is routed under (below) roller bar 12 and anchored at its other end at tie bar 19.

To uncover the container 11, the motor is operated to roll up the tarp 10. As the tarp is drawn onto the roller bar 12, the pivot arms 16 are pulled forwardly, against the bias of the spring assembly, lifting the first end 21 of roller arms 20 until they meet the pivot arm cross bar 15 in the fully retracted positions of FIGS. 1 and 6

Figure 4:
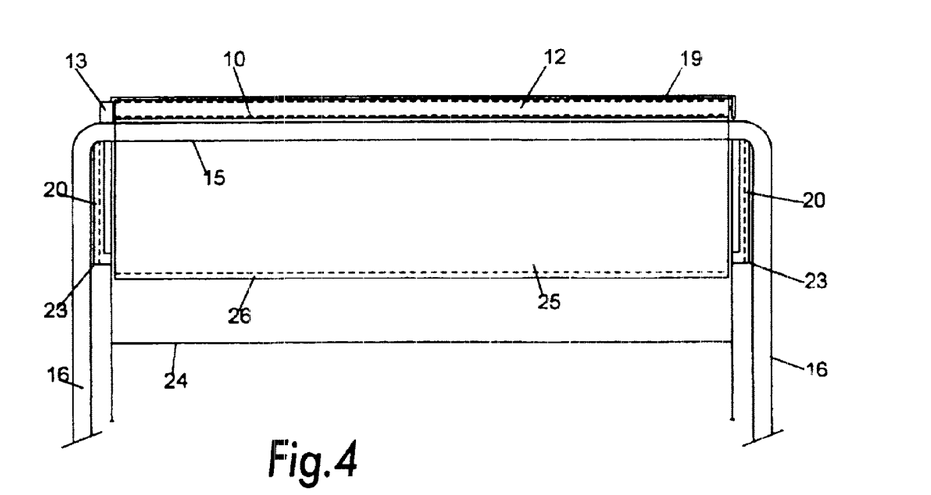
FIG. 4 is a schematic rear view of the embodiment and configuration of FIG. 1.
Figure 5:
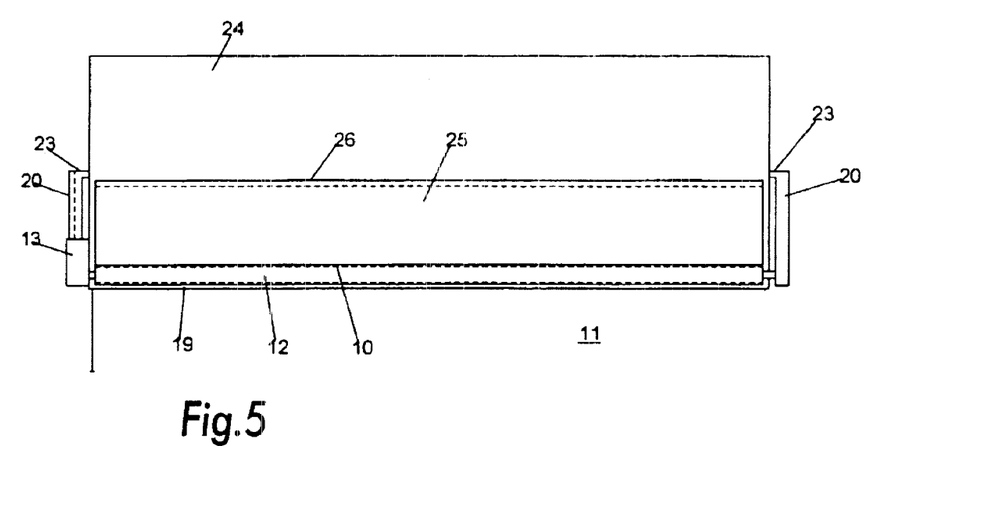
FIG. 5 is a schematic rear view of the configuration shown in FIG. 3.

FIGS. 4 and 5 illustrate the assembly when viewed from the rear of the container 11 and correspond to the configurations shown in FIGS. 1 & 6 and 3 & 7 respectively.

Figure 8:
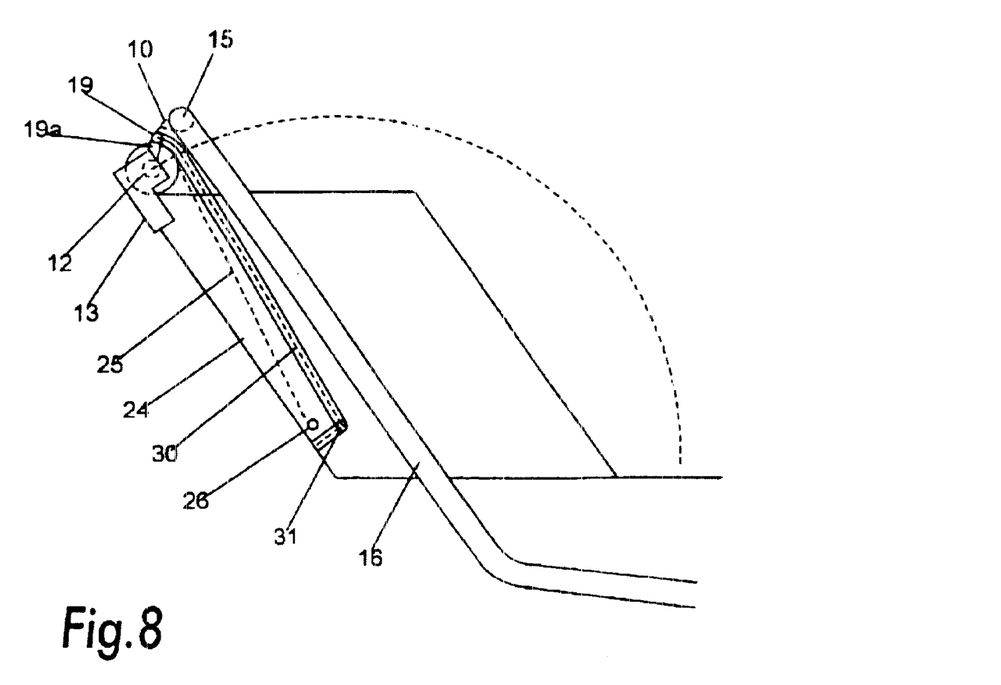
FIG. 8 illustrates schematically in side view a second embodiment of an apparatus in accordance with the present invention in the fully retracted configuration.
Figure 9:
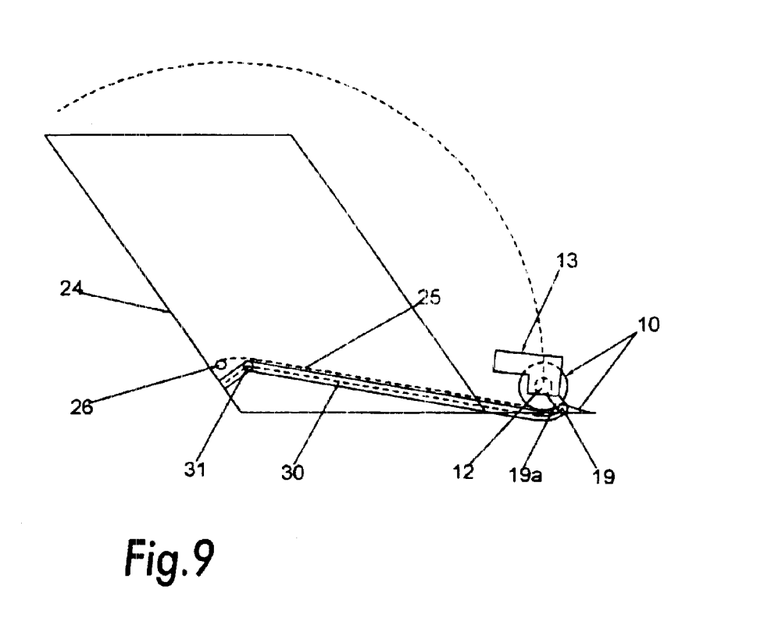
FIG. 9 illustrates schematically in side view a second embodiment of an apparatus in accordance with the present invention in the fully extended configuration.
Figure 10:
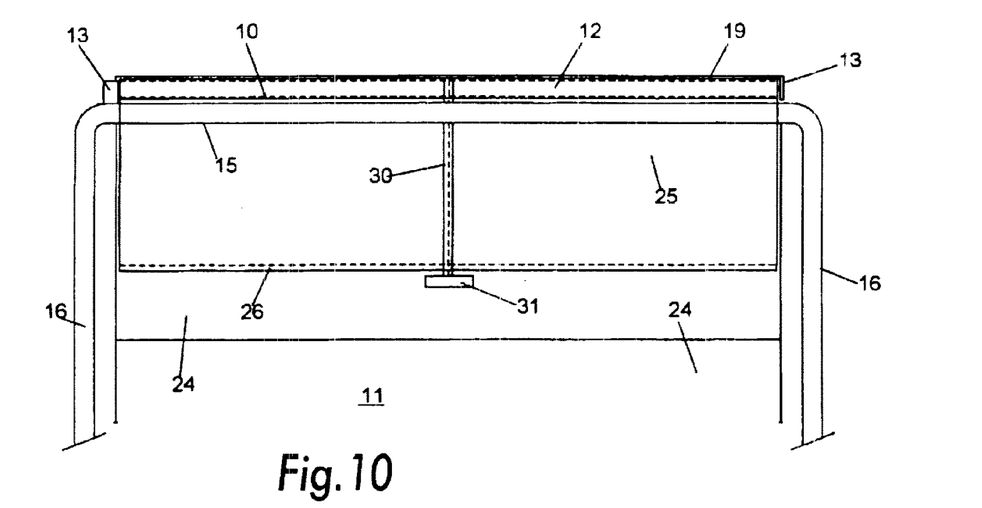
FIG. 10 illustrates in end view the embodiment and configuration of FIG. 8.
Figure 11:
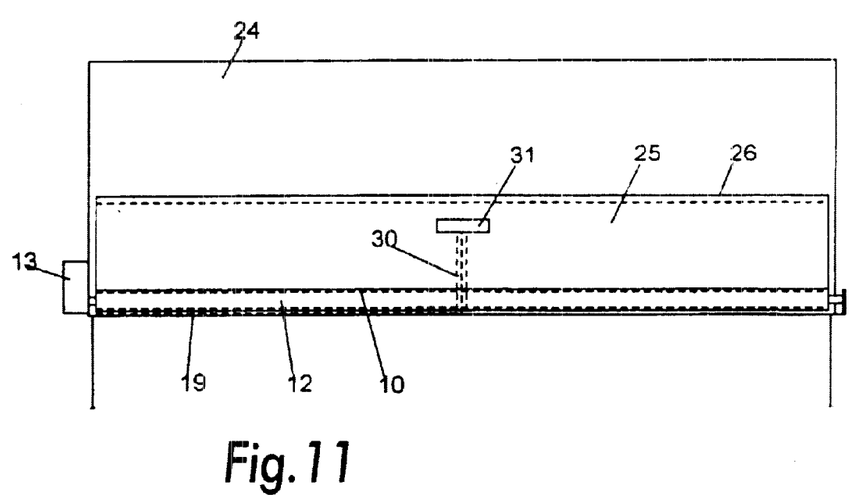
FIG. 11 illustrates in end view the embodiment and configuration of FIG. 9.

FIGS. 8 to 11 illustrate a modification of the embodiment described above in which a single roller arm 30 is provided, and mounted laterally centrally with respect to FIG. 10, rather than at the sides as in the first embodiment. Roller arm 30 is mounted pivotally upon a roller arm support bracket 31 mounted upon the cab-shield or headboard 24 of the vehicle which, in the embodiment as shown, spaces the pivoting point of the roller arm from the headboard. In substantially all other respects, the arrangement and operation is as described for the first embodiment and corresponding components are given the same reference numerals.

However, as shown in FIGS. 8 and 9, as an alternative to the arrangement illustrated for the first embodiment, the end of the roller arm 30 remote the pivoting point is mounted upon the rearward edge of the roller assembly and the pivot sheet 25 is mounted upon the roller assembly forward of the roller arm mounting point. As a result, the pivot sheet anchor point 26 at which the pivot sheet is secured to the headboard 24 is above the roller arm support bracket 31, which corresponds to the roller arm pivot point 23 of the first embodiment. It will be appreciated by those skilled in the art that these arrangements are merely illustrative of numerous alternative arrangements of these components such as two or more internally mounted roller arms.

Figure 12:
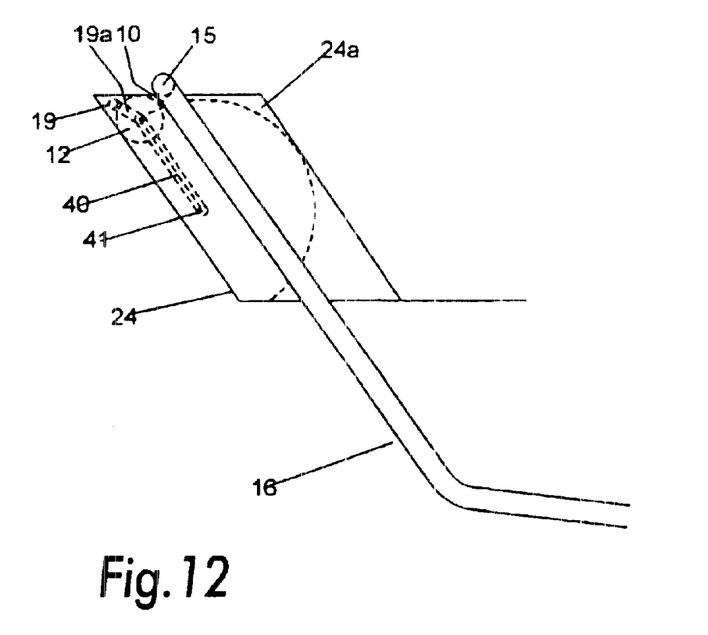
FIG. 12 illustrates schematically in side view a third embodiment of an apparatus in accordance with the present invention in the fully retracted configuration.
Figure 13:
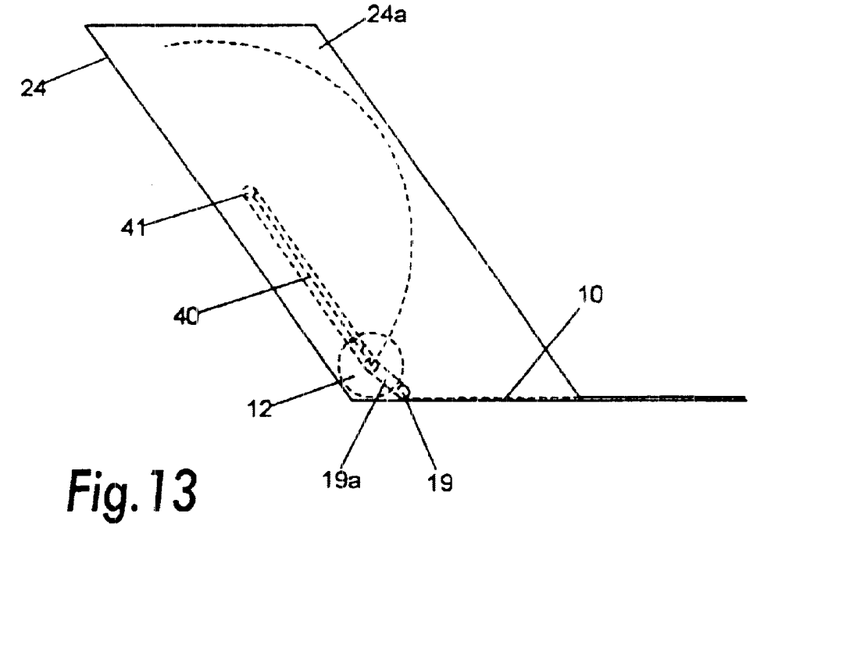
FIG. 13 illustrates schematically in side view a third embodiment of an apparatus in accordance with the present invention in the fully extended configuration.

FIGS. 12 and 13 illustrate a third embodiment of the assembly of the present invention. In this embodiment, the roller arms 40 are pivotable about pivot points 41 provided on the inside of side walls 24a of the cab-shield/headboard arrangement, rather than on the outside of sidewalls as in the first embodiment. This arrangement is particularly applicable with a motor assembly mounted internally of the roller bar 12 as the roller assembly can be mounted closely against the cab-shield/headboard 24. With an externally mounted motor assembly, the side wall 24a adjacent the motor assembly may be modified to extend outwardly beyond the width of the container side walls to accommodate the width of the roller assembly and externally mounted motor assembly. As is shown, the roller arm pivot points 41 can be positioned at a distance above the upper surface of the container 11 corresponding to the length of the roller arm 40. With this arrangement, in the fully extended configuration (FIG. 13) the roller assembly lies against the upper surface of the container 11 and closely adjacent the headboard 24. Accordingly, there is no requirement for an additional pivot sheet.

Figure 14:
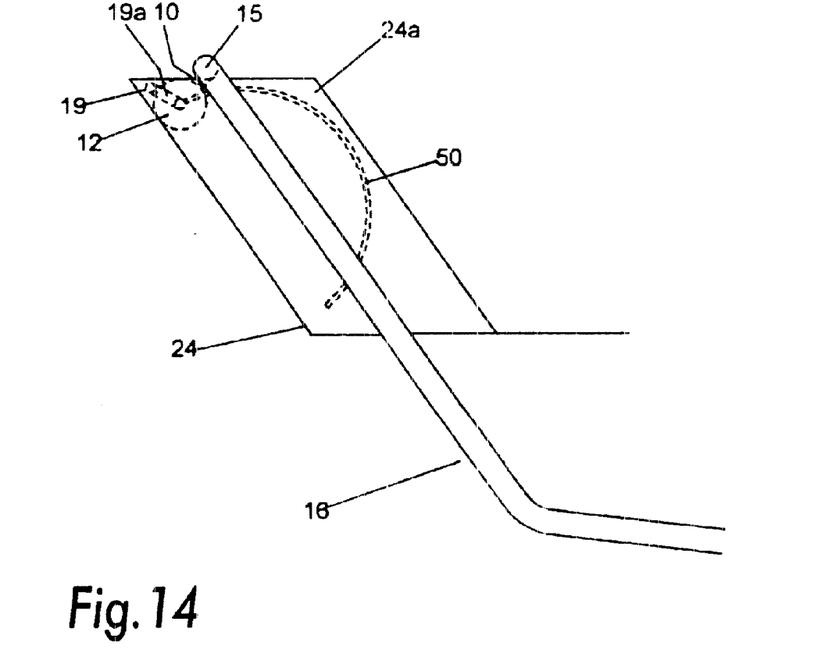
FIG. 14 illustrates schematically in side view a fourth embodiment of an apparatus in accordance with the present invention in the fully retracted configuration.
Figure 15:
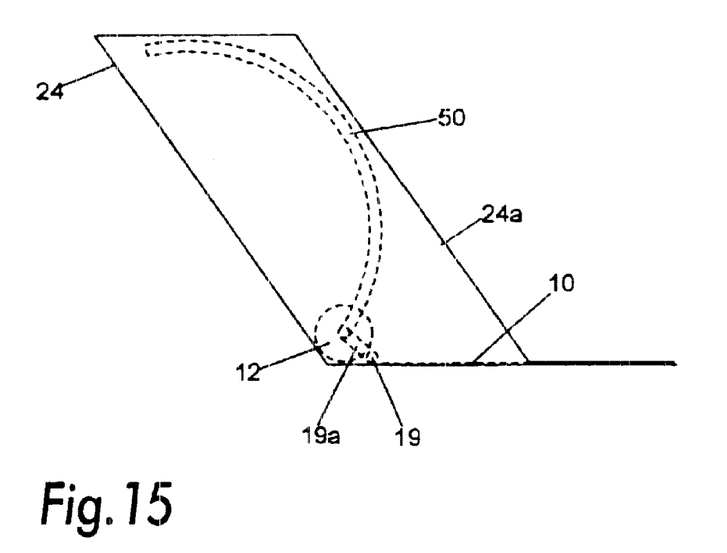
FIG. 15 illustrates schematically in side view a fourth embodiment of an apparatus in accordance with the present invention in the fully extended configuration.

A fourth embodiment is illustrated in FIGS. 14 and 15. In this embodiment, the roller arms 20,30 may be omitted, their function being replaced by an arcuate track 50 formed in each sidewall 24a of the headboard or cab-shield 24. The roller housing is freely slidable within the track 50. Those skilled in the art will be readily able to devise suitable arrangements to ensure that the correct orientation of the roller assembly is maintained as roller housing travels along the track 50. As will be apparent from FIG. 15, such an arrangement also avoids the requirement for a pivot sheet.

Figure 16:
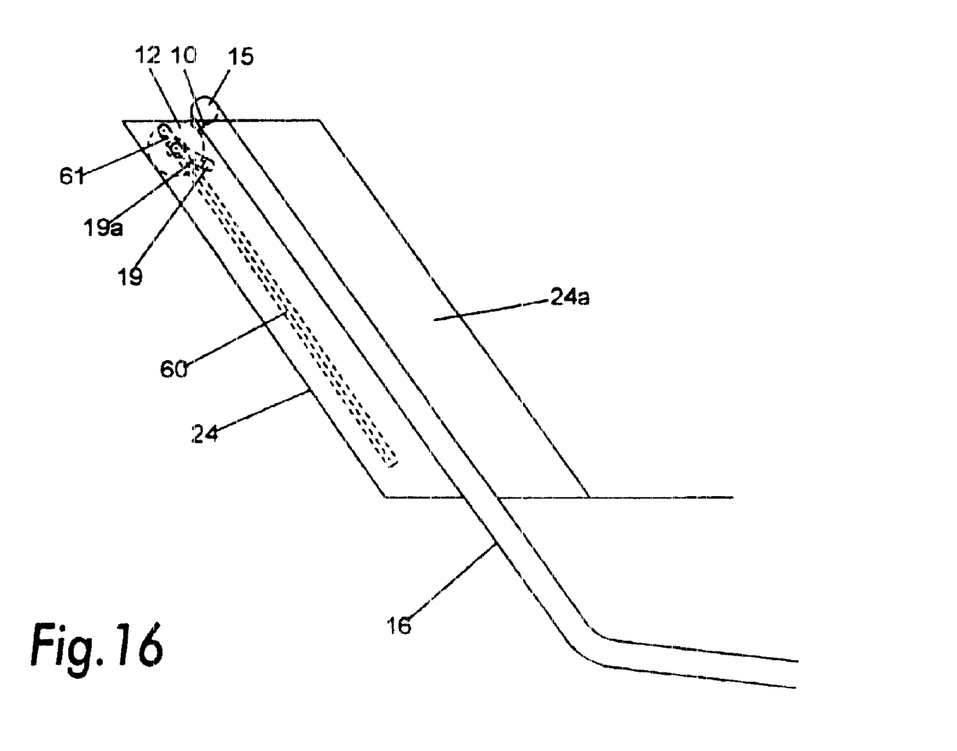
FIG. 16 illustrates schematically in side view a fifth embodiment of an apparatus in accordance with the present invention in the fully retracted configuration.
Figure 17:
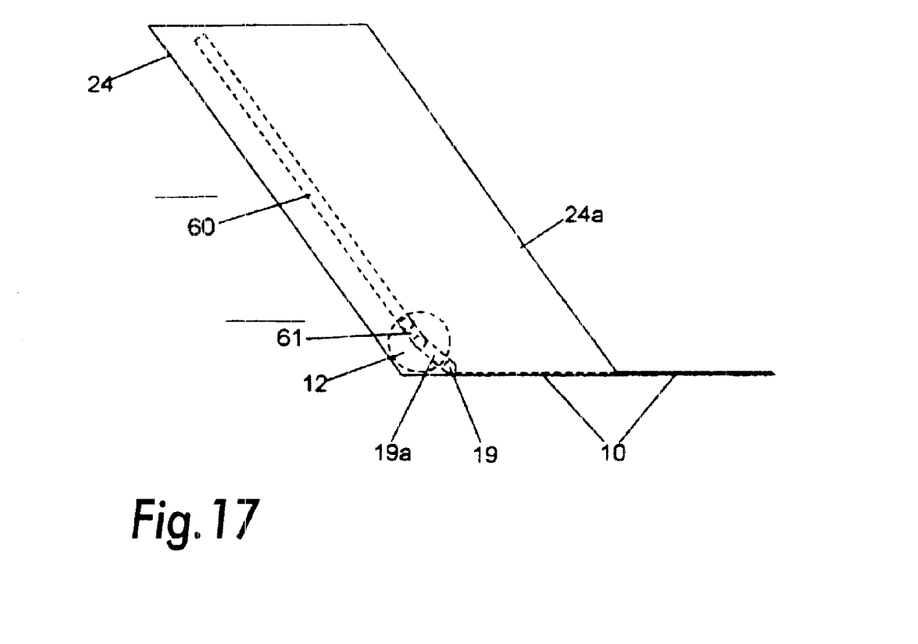
FIG. 17 illustrates schematically in side view a fifth embodiment of an apparatus in accordance with the present invention in the fully extended configuration.

It will be appreciated that the track need not, in fact, be arcuate. FIGS. 16 and 17 illustrate a fifth embodiment comprising a similar arrangement to that of FIGS. 14 and 15, in which the roller assembly runs upon a roller trolley 61 within a linear track 60 orientated substantially parallel to the orientation of the headboard 24.

Figure 18:
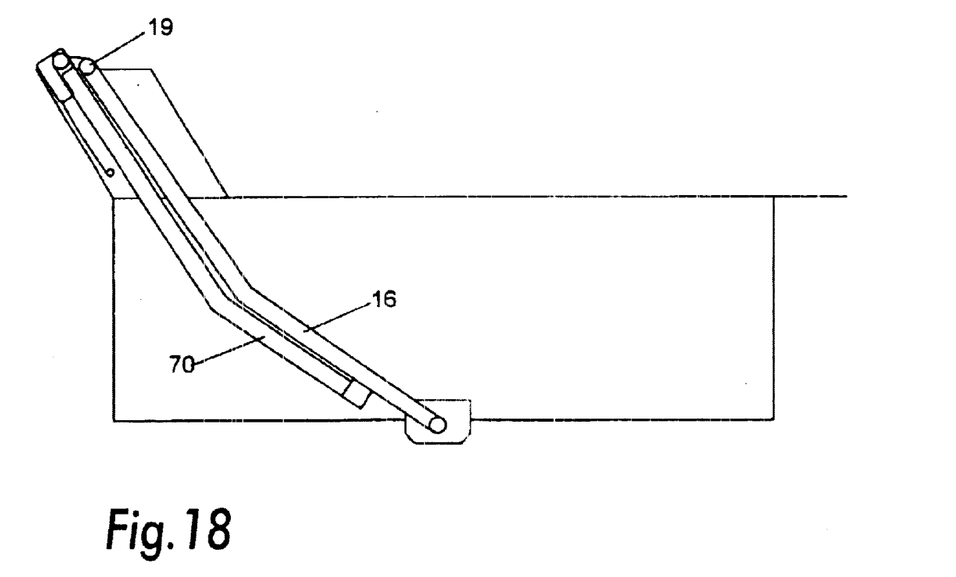
FIG. 18 is a schematic side view of a sixth embodiment of an apparatus in accordance with present invention in a retracted configuration.
Figure 19:
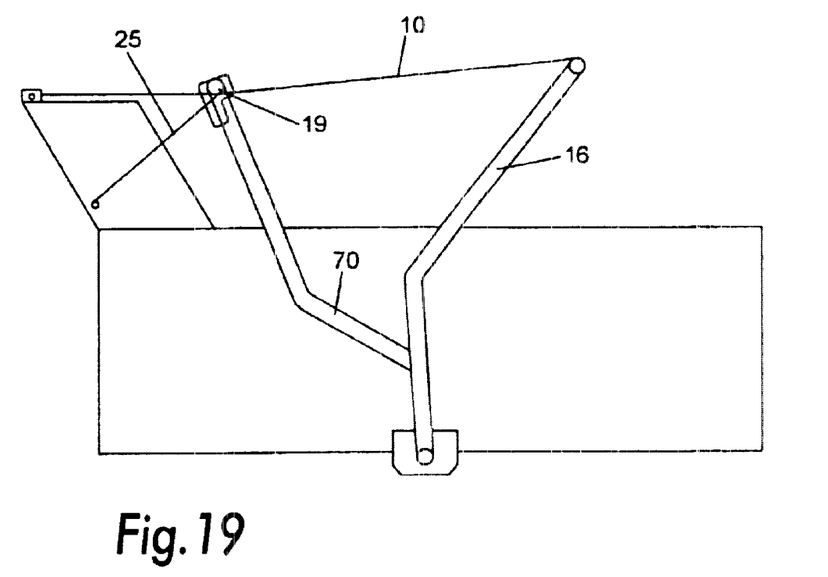
FIG. 19 is a schematic side view of the embodiment of FIG. 18 in a part extended configuration.
Figure 20:
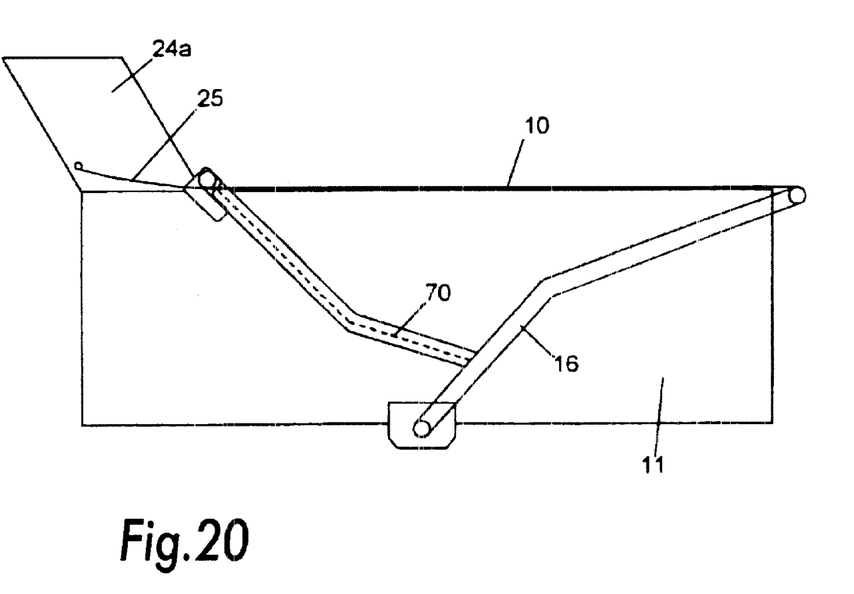
FIG. 20 is a schematic side view of the embodiment of FIG. 18 in a fully extended configuration.

A sixth embodiment is illustrated in FIGS. 18 to 20. In this embodiment, each roller arm 70 is mounted at its lower end upon a respective pivot arm 16. Each roller arm 70 is bent at a point generally intermediate the two ends thereof and pivots about a point generally in the lower half of the pivot arm 16. A roller assembly as described above is mounted between the two upper ends of the roller arms 70. As will be apparent from the Figures, as pivot arms 16, by virtue of their biasing, extract the cover or tarp 10 from the roller bar and pivot towards the rear of the container, the roller arms 70 tend to pivot in the opposite direction to the direction of pivoting of the pivot arms 16, relative to the pivot arms 16. As such, as the pivot arms 16 approach the extended configuration (FIG. 20) the roller assembly is brought down against the upper surface of the container 11. Again, a tie bar 19 spaces the roller assembly from that upper surface and pivot sheet 25 restricts the movement of the roller arm to an arcuate path between upper and lower positions.

Figure 21:
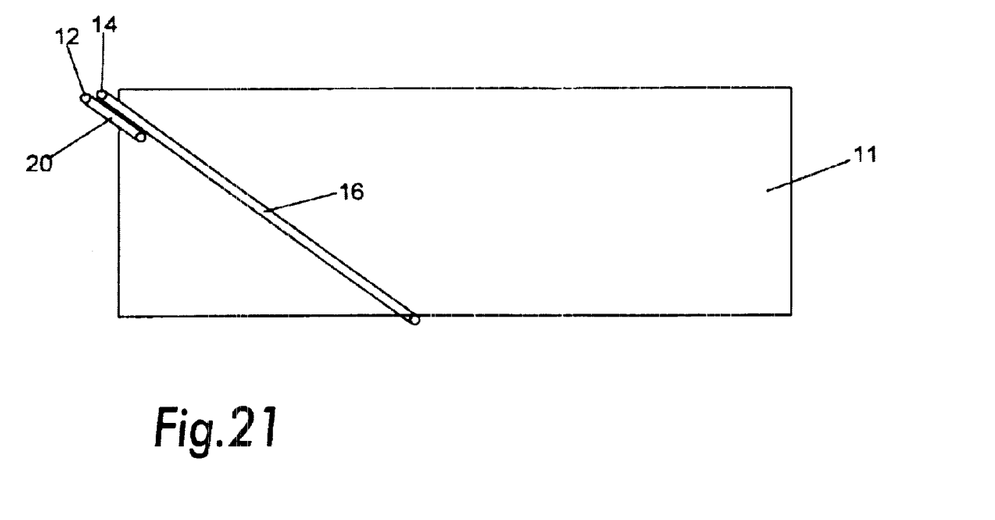
FIG. 21 is a schematic side view of a seventh embodiment of an apparatus in accordance with present invention in a retracted configuration.
Figure 22:
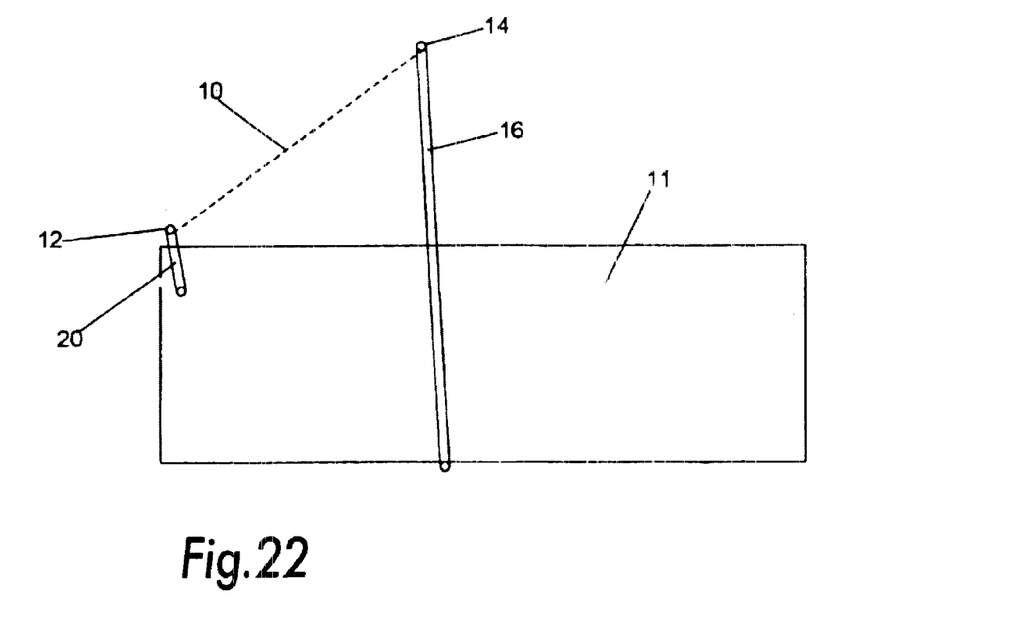
FIG. 22 is a schematic side view of the embodiment of FIG. 21 in a part extended configuration.
Figure 23:
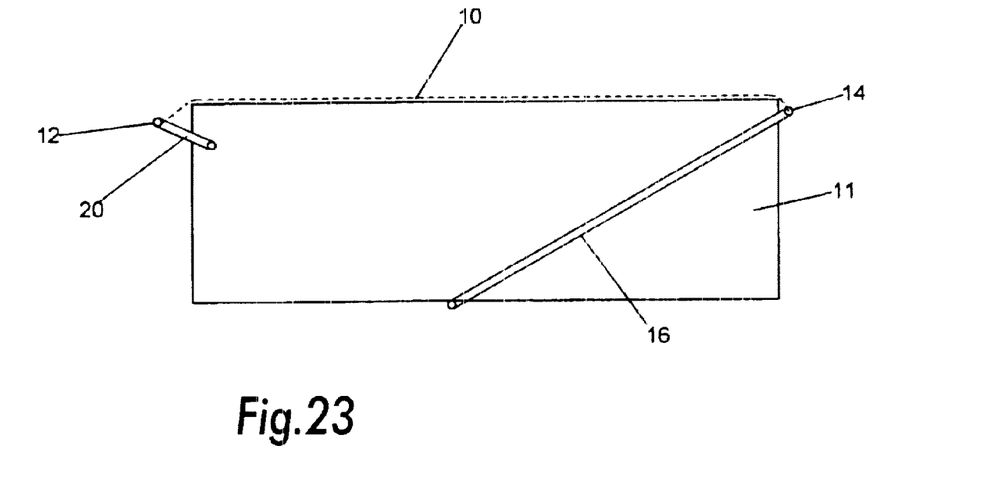
FIG. 23 is a schematic side view of the embodiment of FIG. 21 in a fully extended configuration.

A seventh embodiment is illustrated in FIGS. 21 to 23 in the form of a cover assembly of particular use for trailers or trucks not possessing a headboard. As can be seen by comparing views of FIGS. 21 and 23 with corresponding views of embodiments described earlier, this embodiment and its operation is substantially the same as the other embodiments. In both, the covered and uncovered configurations (FIGS. 21 and 23) roller arm 20 is in a stowed position in which terminal roller bar 12 is below the upper edge of container 11. In intermediate configurations (FIG. 22), roller arm 20 is moved to a more vertical orientation, whereby, during extension of tarp 10, the roller bar 12 and thus the tarp is held away from contacting the container 11, thereby reducing wear on the tarp. In the uncovered configuration the tarp roller bar 12 is held in front of the open container 11 thereby avoiding damage during filling of the container 11. In the covered configuration, roller bar 12 is held in the same position, in front of and below, the edge of the container 11 thereby preventing air from entering container 11. Additionally, as the front corners of a trailer often have a radiused shape, the mounting position for the roller arms, further toward the rear of the trailer, allows the pivot point to miss the radius and be mounted on the flat side walls of the trailer. Other roller assemblies mounted permanently to the front of the trailer require a secondary bracket to square off the radius front corners, and since the roller bar must be mounted above the height of the front edge to avoid wear, a tarp housing or wind deflector must also be used to divert air from working under the leading edge of the tarp.

As is shown, typically roller arm 20 is pivotally mounted at its lower end at a point on the container 11 towards the forward and upper end thereof. In an alternative embodiment (not shown) roller arm 20 may be extended to be pivotally mounted at a point on a vehicle chassis adjacent the point at which the lower ends 17 of pivot arms 16 pivot. This avoids any operative connection between the cover assembly and the container 11 enabling use of the cover assembly with so called roll-on-roll-off trucks or trailers which have demountable containers.

Figure 24:
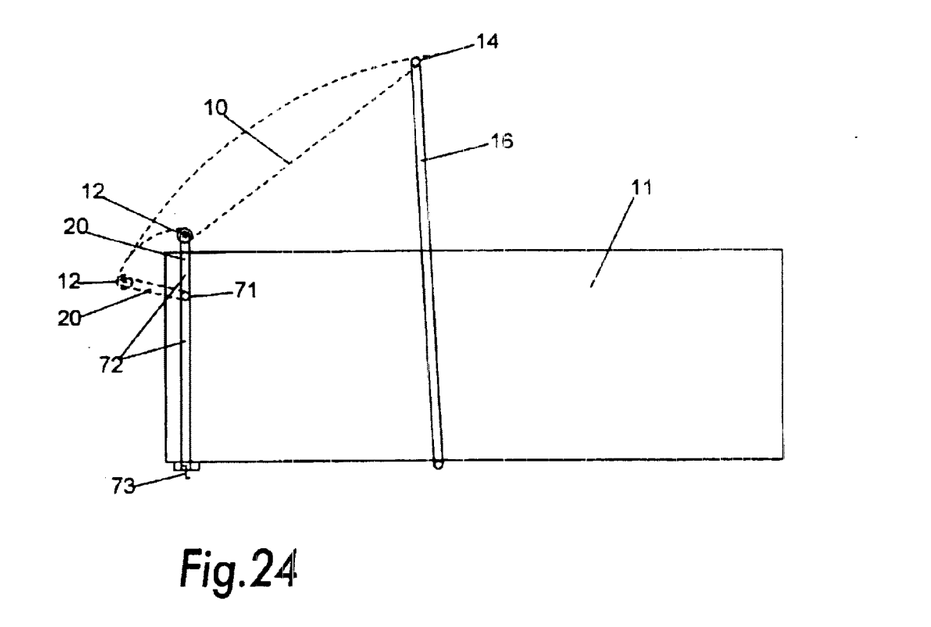
FIG. 24 is a schematic side view of an eighth embodiment of an apparatus in accordance with the present invention in a partially extended configuration.

As is illustrated in FIG. 24, the assembly need not necessarily be motor actuated, although clearly such an arrangement will be convenient. In this embodiment roller arm 20 is pivotally mounted at its lower end 71 at a pivot axis and is connected by means of a belt or chain drive assembly 72 to a hand crank 73, actuation of which causes roller arm 20 to pivot from a stowed position below and forward of the container 11 (shown in FIG. 24 by the dotted line) to a position above the container 11 whereby tarp 10 is brought away from contact with the container.

Figure 25:
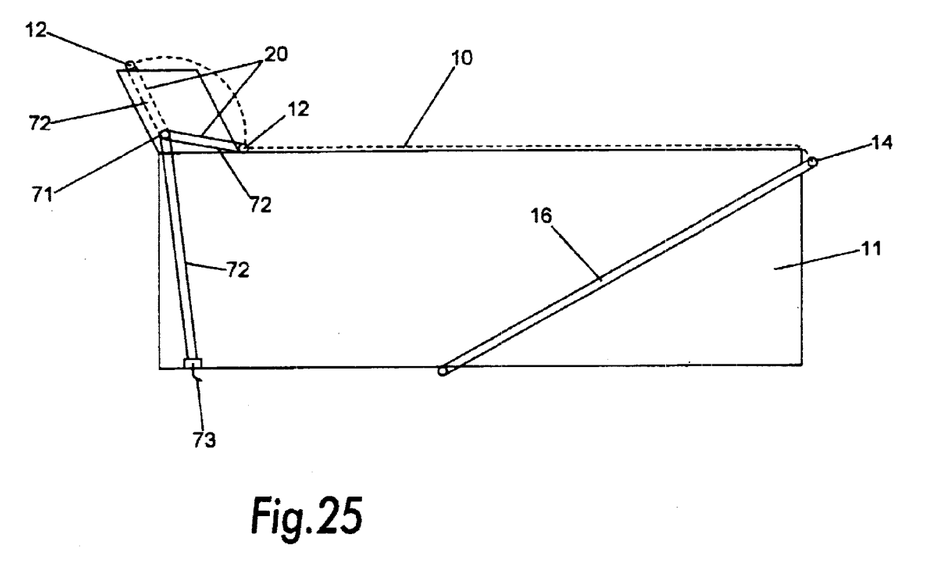
FIG. 25 is a schematic side view of a ninth embodiment of an apparatus in accordance with the present invention in a covered configuration.

A similar arrangement is illustrated in FIG. 25 intended for use with trucks or trailers having a headboard.

Hitherto, no cover assemblies for trucks and lorries have been disclosed which eliminate the problems of both a roller assembly mounted at the base of the headboard or cab-shield and the problems with a roller assembly mounted at the top thereof. With the roller assembly of the present invention, being moveable between upper and lower positions, the roller assembly is up and out of the way of equipment when material is being loaded into the body of the truck, and it is tucked down low during transport, eliminating the gap between the sides of the truck and the cover, and eliminating the need for a wind deflector or housing to prevent wind from blowing up under the leading edge of the cover during transport.

It will be appreciated by those skilled in the art that reversing the positions of the cover support element and the variable position roller assembly will obtain the same objectives. Accordingly, these arrangements form a yet further aspect of the present invention.

What is claimed is:

1. A cover assembly for a container of a vehicle; the container having first and second ends and the cover assembly comprising a retractable cover having a first end attached to a roller assembly and a second end attached to a cover support element, the cover assembly comprising rolling means adapted to roll the cover upon the roller assembly; wherein the cover support element is supported by at least one pivot arm at an upper end thereof, said pivot arm being pivotable about a lower end thereof at a point intermediate the two ends of the container and adjacent the bottom of the container, between a first position in which the cover support element is adjacent the first end of the container and a second position in which the cover support element is adjacent the second end of the container; and wherein the roller assembly is mounted for movement between a lower position in which the roller assembly is substantially adjacent the top of the container at the first end thereof when the pivot arm is in said second position, and an upper position in which the roller assembly is more greatly spaced from the top of the container when the pivot arm is in the first position.

2. A cover assembly as claimed in claim 1 wherein the rolling means comprises a motor assembly associated with the roller assembly.

3. A cover assembly as claimed in claim 2 wherein the motor assembly is an electric, pneumatic or hydraulic motor.

4. A cover assembly as claimed in claim 3 wherein the motor assembly is mounted externally from the roller assembly.

5. A cover assembly as claimed in claim 3 wherein the roller assembly includes a cavity adapted to house the motor assembly.

6. A cover assembly as claimed in claim 1 wherein the rolling means includes a spring assembly adapted to bias the retractable cover into a rolled configuration.

7. A cover assembly as claimed claim 1 wherein at least one pivot arm is biased by means of a spring associated with the lower end of the pivot arm into a position in which the cover support element is adjacent the second end of the container.

8. A cover assembly as claimed claim 1 wherein at least one pivot arm is biased by means of hydraulic or pneumatic cylinder(s) in conjunction with a spring biased roller assembly.

9. A cover assembly as claimed in claim 1 wherein the roller assembly is mounted for movement between the upper and lower positions by being mounted upon at least one pivotally mounted roller arm.

10. A cover assembly as claimed in claim 9 wherein said at least one roller arm is pivotally mounted at a point intermediate the upper and lower positions.

11. A cover assembly as claimed in claim 1 wherein the vehicle is a road lorry having a headboard or cab-shield and a roller arm pivot point is provided internally or externally mounted on side plates of the headboard or cab-shield, or upon a rearwardly directed sidewall attached to the headboard or cab-shield.

12. A cover assembly as claimed in claim 1 in which the vehicle or the container is provided with sidewalls adjacent and above each side of the first end of the container, the roller assembly is mounted for movement between the upper and lower positions by being mounted to run between and in respective tracks along said sidewalls.

13. A cover assembly as claimed in claim 12 wherein said tracks are non-linear and may be arcuate, conforming to the shape and design of the headboard or cab-shield.

14. A cover assembly as claimed in claim 12 wherein said tracks are linear.

15. A cover assembly as claimed in claim 9, wherein said roller arm is pivotally mounted upon a respective pivot arm.

16. A cover assembly as claimed in claim 1 wherein, the roller assembly further includes a tie bar and a roller bar and wherein the roller bar is substantially parallel with the roller bar and extending below the roller bar to contact the top edges of container side rails when the tarp is in the fully extended position.

17. A covering assembly for covering an open top of a vehicle mounted container having a first end and a second end joined by two side walls, together forming an upper edge that defines a container opening, comprising a retractable cover having a first end attached to a variable position roller assembly, and a second end attached to a cover support element; wherein the cover support element extends substantially transversely between said two side walls of said container and is supported by at least one pivot arm attached to an end of the cover support element at an upper end of said at least one pivot arm, said at least one pivot arm being pivotable about a lower end thereof at a point on or adjacent at least one of said two side walls, intermediate said first and second ends of said container, and is biased about said intermediate point between a first position in which the cover support element is adjacent the first end of said container and a second position in which the cover support element is adjacent the second end of said container; and wherein the variable position roller assembly is mounted with means for movement of said roller assembly from a first position in which said roller assembly is substantially adjacent or below the upper edge of said first end of said container when pivot arms are in said second position, said roller assembly then moving through a variable range of motion as said at least one pivot arm moves to a first position in which said roller assembly substantially meets the cover support element at said first position of said at least one pivot arm, adjacent said first end of said container; and wherein said roller assembly is actuated by rolling means.

18. A covering assembly according to claim 17 wherein said roller assembly is actuated by said rolling means which in turn actuates movement of said roller assembly throughout its the variable range of motion in cooperation with movement of said at least one pivot arm between said first and second positions.

19. The covering assembly according to claim 17, further comprising biasing means to move at least one pivot arm from said first position to said second position is a torsion, compression, or extension spring.

20. The covering assembly according to claim 17, further comprising biasing means to move at least one pivot arm between said first position and said second position is at least one hydraulic or pneumatic cylinder, or electric motor-driven actuator.

21. The covering assembly according to claim 17 wherein said first position of the variable position roller assembly is a lower position in which said roller assembly is substantially adjacent the upper edge of said container at the first end thereof when said at least one pivot arm is in said second position, and said second position is an upper position in which said roller assembly is more greatly spaced from the upper edge of said container when said at least one pivot arm is in said first position.

22. The covering assembly according to claim 20, wherein said biasing means includes at least one pivotally mounted roller arm, pivotally mounted at a point intermediate the upper and lower positions of the roller assembly.

23. The covering assembly according to claim 17, wherein said rolling means is an electric, pneumatic, or hydraulic motor associated with said roller assembly.

24. The covering assembly according to claim 17, wherein said rolling means includes a spring assembly adapted to bias the retractable cover into a rolled configuration.

25. The covering assembly according to claim 17, wherein said rolling means is a manual crank assembly including at least one of a chain and sprocket arrangement and a belt and pulley arrangement to bias said roller assembly.

26. The covering assembly according to claim 17, wherein said means for movement of said roller assembly includes at least one pivotally mounted roller arm supporting at least one end of said roller assembly.

27. The covering assembly according to claim 17, wherein said means for movement of said roller assembly includes a track system in which both ends of said roller assembly are supported by and slide within parallel tracks mounted on or from said container.

28. A covering assembly as claimed in claim 17 wherein said at least one pivot arm is pivotally mounted to a frame of the vehicle.

29. A covering assembly as claimed in claim 17 wherein the variable position roller assembly is mounted to a frame of the vehicle.

30. The covering assembly according to claim 18, further comprising biasing means to move at least one pivot arm from said first position to said second position is a torsion, compression, or extension spring.

31. The covering assembly according to claim 18, further comprising biasing means to move at least one pivot arm between said first position and said second position is at least one hydraulic or pneumatic cylinder, or electric motor-driven actuator.

32. The covering assembly according to claim 18 wherein said first position of the variable position roller assembly is a lower position in which said roller assembly is substantially adjacent the upper edge of said container at the first end thereof when said at least one pivot arm is in said second position, and said second position is an upper position in which said roller assembly is more greatly spaced from the upper edge of said container when said at least one pivot arm is in said first position.

33. The covering assembly according to claim 20, wherein said means for movement of said roller assembly includes at least one pivotally mounted roller arm, pivotally mounted at a point intermediate the upper and lower positions.

34. The covering assembly according to claim 18, wherein said rolling means is an electric, pneumatic, or hydraulic motor associated with said roller assembly.

35. The covering assembly according to claim 18, wherein said rolling means includes a spring assembly adapted to bias the retractable cover into a rolled configuration.

36. The covering assembly according to claim 18, wherein said rolling means is a manual crank assembly including at least one of a chain and sprocket arrangement and a belt and pulley arrangement to bias said roller assembly.

37. The covering assembly according to claim 18, wherein said means for movement of said roller assembly includes at least one pivotally mounted roller arm supporting at least one end of said roller assembly.

38. The covering assembly according to claim 18, wherein said means for movement of said roller assembly includes a track system in which both ends of said roller assembly are supported by and slide within parallel tracks mounted on or from said container.

39. A covering assembly as claimed in claim 18 wherein said at least one pivot arm is pivotally mounted to a frame of the vehicle.

40. A covering assembly as claimed in claim 18 wherein the variable position roller assembly is mounted to a frame of the vehicle.

* * * * *